Figure 1:
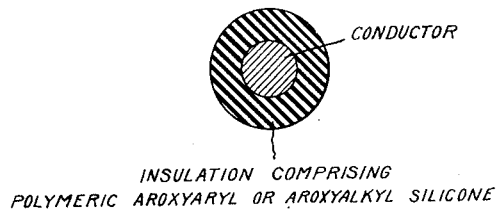

INSULATION COMPRISING
POLYMERIC AROXYARYL OR AROXYALKYL SILICONE

INSULATION COMPRISING AN INTIMATE ASSOCIATION
OF FIBROUS MATERIAL AND A COMPOSITION COMPRISING
POLYMERIC AROXYARYL OR AROXYALKYL SILICONE

Inventor:
Eugene G. Rochow,
by Harry E. Dunham
His Attorney.

Patented Oct. 7, 1941

2,258,221

UNITED STATES PATENT OFFICE 2,258,221

AROXY SILICONES AND INSULATED CONDUCTORS AND OTHER PRODUCTS UTILIZING THE SAME

Eugene G. Rochow, West Albany, N. Y., assignor to General Electric Company, a corporation of New York Application April 27, 1940, Serial No. 332,098

20 Claims. (Cl. 174—121)

The present invention relates to new compositions of matter and, more particularly, to compositions comprising new and useful aroxy silicones. The scope of the invention also includes products wherein these new compositions are utilized, for example insulated electrical conductors comprising a metallic conductor and insulation thereon comprising the new compositions of this invention. This application is a continuation-in-part of my copending application Serial No. 296,819, filed September 27, 1939, and assigned to the same assignee as the present invention.

In the chemical literature, the name "silicone" is given to compounds of the general formula

and their polymers, where R and R' are the same or different alkyl or aryl radicals or any other organic radicals capable of direct union with the silicon atom.

With reference to the above formula, the products of this invention are those in which both R and R' are radicals which may be represented by A—O—A', where A is an aryl radical (halogenated or non-halogenated) and A' is a member of the class consisting of alkyl radicals and aryl radicals (halogenated or non-halogenated).

In my above-identified copending application I showed the production of new and useful silicones in which either or both R and R' in the above formula are halogenated aryl radicals. When only one of the groupings is a halogenated aryl radical, the other may be an alkyl, aryl, aralkyl or other non-halogen-containing grouping capable of being attached directly to silicon. Examples of such halogenated silicons are di-(trichlorophenyl) silicone, di-(monobromophenyl) silicone, di-(monochlorotolyl) silicone, methyl trichlorophenyl silicone, etc. I also showed in copending application Serial No. 296,-819 that in producing the halogenated aryl silicones disclosed and broadly claimed in the application, halogen derivatives of diphenyl ether and other aryl compounds capable of being attached by carbon linkage to a silicon atom could be employed. However, no specific claims were made in the said copending application to halogenated phenoxyphenyl silicones or to other halogenated aroxyaryl silicones.

The claims in the present application differ from those in my copending application Serial No. 296,819 in that they are directed to silicones and their polymers in which two A—O—A' groups are attached directly to a silicon atom. The letter A may represent either a halogenated or a non-halogenated aryl radical and the letter A' an alkyl radical, e. g., methyl, ethyl, propyl, butyl to octadecyl, or a halogenated or a non-halogenated aryl radical. The aryl radicals may be the same or different; for example, one may be phenyl and the other tolyl, or one may be a halogenated radical and the other a non-halogenated radical. Illustrative examples of aryl radicals which A and A' in the grouping A—O—A' may be are: phenyl, mono- and polyalkyl phenyls, more specific examples of which are tolyl, xylyl, mono-, di- and tri-ethyl phenyls, mono-, di- and tri-propyl phenyls, etc.; naphthyl, mono- and poly-alkyl naphthyls, e. g., methyl naphthyl, diethyl naphthyl, tri-propyl naphthyl, etc., tetrahydronaphthyl; anthracyl; and the halogenated derivatives of such radicals, more particularly the chloro, fluoro, bromo and iodo derivatives of such radicals.

Any suitable method may be used in preparing the new silicones of this invention, the choice of the method being determined largely by the yield obtained. For example, these new chemical compounds may be prepared by hydrolyzing a mass containing a compound having the formula (A—O—A')$_2$SiX$_2$, where A is an aryl (halogenated or non-halogenated) radical, A' is a member of the class consisting of alkyl radicals and aryl (halogenated or non-halogenated) radicals and X is a halogen atom, specifically a chlorine atom. The hydrolyzed product is dehydrated to form the corresponding silicone at normal (room) temperature, or more rapidly at elevated temperatures, and under atmospheric or subatmospheric pressure conditions.

In order that those skilled in the art better may understand how the present invention may be carried into effect, the following illustrative example thereof is given:

(1) One hundred (100) parts by weight of p-bromodiphenyl ether was converted to phenoxyphenyl magnesium bromide;

C$_6$H$_5$—O—C$_6$H$_4$Br+Mg in dry ether→
C$_6$H$_5$—O—C$_6$H$_4$MgBr (2) This was caused to react with silicon tetrachloride in ether solution:

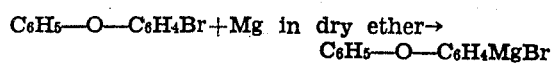

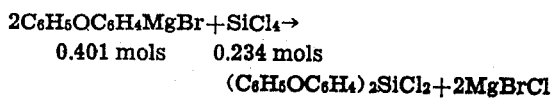

Because of the molar proportions used, there was also formed a mono phenoxyphenyl derivative of SiCl₄.

(3) The reaction mixture was hydrolyzed by pouring the cold solution upon cracked ice:

$(C_6H_5OC_6H_4)_2SiCl_2 + 2\ H_2O \rightarrow$
$\quad\quad (C_6H_5OC_6H_4)_2Si(OH)_2 + 2\ HCl$
$C_6H_5OC_6H_4SiCl_3 + 3\ H_2O \rightarrow$
$\quad\quad C_6H_5OC_6H_4Si(OH)_3 + 3\ HCl$ (4) The resulting hydroxy compounds or silicols were washed with water to remove excess acid, after which they were partly condensed to silicones by first distilling off the ether and then heating the ether-free mass, more particularly at 110° C. for 4 hours. It will be understood, of course, that the condensation to a silicone is not a simple reaction, but one of gradual dehydration. Hence, this product of partial condensation (or polymerization), which at this stage is a brown viscous liquid, is probably mainly a mixture of polymers or condensation products of the types (A) OH—Si(C₆H₅OC₆H₄)₂—O—
$\quad\quad$ Si(C₆H₅OC₆H₄)₂—OH;

(B) OH—Si(C₆H₅OC₆H₄)₂—O—
$\quad\quad$ Si(C₆H₅OC₆H₄)₂—O—Si(C₆H₅OC₆H₄)₂—OH;

(C) [Si(C₆H₅OC₆H₄)₂O]₃, a cyclic trimer; etc.

This brown viscous liquid is insoluble in water, but soluble in organic solvents, e. g., benzene, toluene, ether, etc.

(5) Upon heating at a higher temperature, for instance at from about 150° to 225° C. for at least one hour, the above-described low molecular weight polymers continue to condense and are converted into polymers having the probable unit structure

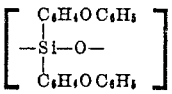

In many applications of these new silicones step No. 5 advantageously may be carried out in situ as hereafter more fully described. Heating the partial polymer of step No. 4 for one hour at 175° C. yielded a hard, brown resin which, on analysis, showed 66.4% carbon, 5.23% hydrogen and 11.8% silicon. This analysis shows that this particular polymeric aroxy silicone contains approximately 1.09 phenoxyphenyl groups per silicon atom.

In the aroxy silicones of this invention the aroxy groups may be attached to any or all of the silicon atoms in the molecule. Ordinarily the polymeric silicone will have in its molecule an average of about one to not more than two aroxy groups, more particularly aroxyaryl or aroxyalkyl groups, per silicon atom. Polymeric aroxy silicones containing an average of less than two aroxy groups for each silicon atom are preferred. Products having good thermal resistance and a wide variety of applications are polymers containing an average of approximately 1 to approximately 1.5 aroxy groups, specifically phenoxyphenyl groups, per silicon atom. Silicones having an average of less than one aroxyaryl or aroxyalkyl group per silicon atom also may be produced in accordance with the present invention.

The introduction of halogen atoms into the aryl nucleus or nuclei of these new aroxyaryl and aroxyalkyl silicones imparts flame resistance to the end-products. Thus, whereas non-halogenated phenoxyphenyl silicone burns upon application of a flame, the introduction of one halogen atom, specifically a chlorine atom, into the phenyl group or groups render the product less flammable. Similarly the introduction of two chlorine atoms into the phenyl group or groups imparts greater flame resistance than one chlorine atom. Such mono- and di-halo derivatives may not be wholly flameproof. Hence for optimum flame resistance it is advantageous to introduce at least three halogen atoms, e. g., chlorine atoms, into each phenyl group thereby to obtain a substantially non-flammable composition. Similarly, with other aroxy derivatives I may introduce any number of halogen atoms up to the limit of combining power of the particular nucleus. If desired, instead of introducing a single halogen such as chlorine into the aryl nucleus or nuclei, a mixture of halogens, e. g., a mixture of chlorine and bromine, may be introduced therein.

The aroxy silicones of this invention ordinarily are resinous in character. In their final form as polymeric bodies they have the advantage of thermal stability greater than that of the ordinary coating and bonding agents. The partial condensation products or polymers polymerize slowly upon the application of heat, changing from soluble thermoplastic bodies to substantially infusible, relatively insoluble resinous masses. As the heating is continued, their solubility in organic solvents correspondingly decreases and they become more brittle at room temperature. These highly polymerized bodies are unaffected by water, and they are able to resist temperatures of the order of 300° C. for prolonged periods of time without any great change in their physical properties. They have good electrical properties.

As these new aroxy silicones are free from many of the limitations of the purely organic substances, they may be used to advantage with inorganic fillers and fibers such as asbestos, mica, glass fiber, and the like, to provide a composite insulation capable of withstanding higher temperatures than would be possible with the use of organic binders. This in turn permits the design of electrical machinery for operation at higher temperatures.

Figure 2:
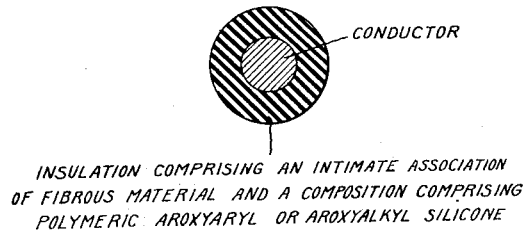

To illustrate how compositions comprising the herein-described aroxy silicones may be used in the field of insulation, the following examples are cited:

A liquid coating composition comprising partly polymerized aroxy silicone, e. g., an aroxyaryl silicone and, more particularly, a phenoxyphenyl silicone, and a volatile solvent may be applied to a metallic conductor such as copper wire, which thereafter is heated to vaporize the solvent and to continue or complete the polymerization of the silicone in situ. In manufacturing certain kinds of electrical cables it may be desirable to wrap the conductor with an organic or inorganic fibrous material such as asbestos, glass, cotton or paper before treating with the solution. A further procedure is to coat and at least partly impregnate the wrapped conductor with an aroxy silicone, wind the thus insulated conductor into the desired coil, and then heat the wound coil to complete the polymerization of the silicone. In the accompanying drawing Fig. 1 represents a cross-sectional view of a metallic conductor provided with insulation comprising polymeric aroxyaryl or aroxyalkyl silicone; and Fig. 2 shows a similar view of a metallic conductor provided with insulation comprising an intimate association of fibrous material and a composition comprising polymeric aroxyaryl or aroxyalkyl silicone.

Sheet insulation may be prepared by treating woven or felted organic or inorganic fabrics or paper with compositions comprising an aroxy silicone. Sheet insulation also may be prepared by binding flaky inorganic substances with an aroxy silicone. For example, a phenoxyphenyl silicone may be used in the production of laminated mica products comprising mica flakes cemented and bonded together with the silicone.

Self-supporting coherent films or sheets of clay such as bentonite may be treated to advantage with compositions comprising an aroxy silicone. The silicone may be applied in melted or solution state. In the production of such sheet materials from bentonite, particles of bentonite of ultra-microscopic size are employed, for example particles having a maximum diameter of 3000 A. (Ångstrom), more specifically from about 500 A. to about 2000 A. Fibers such as glass may be embedded in, or otherwise associated with, such clayey films or sheets and the composite material treated, for instance coated, with an aroxy silicone. These aroxy silicone-treated bentonite and bentonite-glass fiber flexible sheet materials may be used to particular advantage for high temperature electrically insulating applications.

In addition to their use in the field of insulation, the aroxy silicones of this invention also may be used as protective coatings, for instance as coatings for base members such as glass bulbs and other articles of manufacture which are, or may be, exposed to abnormal heat conditions or to hot flying particles. They also may be used as sealing compositions, in the production of so-called resistance of semi-conducting paints, and for other applications as described more fully in my copending application Serial No. 296,819 with particular reference to halogenated aryl silicones.

In certain cases it may be desirable to co-polymerize mixtures of compounds having a particular ratio of aroxyaryl (or aroxyalkyl) groups to silicon in the molecule of each individual compound. This may be done, for example, by mixing suitable proportions of, say, mono- and di-(phenoxyphenyl) silicon chlorides, hydrolyzing the mixture and dehydrating the resulting product. In other cases the separately hydrolyzed products may be mixed and thereafter dehydrated. However, in such cases the components should be mixed before condensation and polymerization have advanced to the point where the bodies become incompatible. For other applications it may be desirable to polymerize the individual silicones to solid form and then mix and grind the materials together to obtain a composite mass. In these and other ways compositions comprising aroxy silicone having properties best adapted for a particular application may be obtained.

The individual, co-polymerized, or mixed solid polymeric aroxy silicones of this invention may suitably be incorporated into other materials to modify the properties of the latter. For example, they may be compounded with substances such as natural and synthetic rubber; tars, asphalts and pitches, more specific examples of which are wood tars, petroleum asphalts and vegetable pitches; natural resins such as wood rosin, copal, shellac, etc.; synthetic resins such as phenol-aldehyde resins, urea-aldehyde resins, modified and unmodified alkyd resins, cumar resins, vinyl resins, esters of acrylic and methacrylic acids, etc.; cellulosic materials such as paper, inorganic and organic esters of cellulose such as cellulose nitrate (pyroxylin), cellulose acetate including the triacetate, cellulose propinate, cellulose butyrate, etc., cellulose ethers such as methyl cellulose, ethyl cellulose, benzyl cellulose, etc., as well as with various other organic plastic compositions. In certain cases the hard, brittle polymers may be pulverized and used as fillers for substances such as above mentioned. In other cases, especially when the silicone is compatible with the substance with which it is to be incorporated, it may be in the form of a liquid or relatively soft polymer of low molecular weight prior to compounding with the substance to be modified.

These new aroxy silicones also may be compounded with various other materials. For example, the hard, brittle polymers may be plasticized by the addition of suitable plasticizing agents, or the silicones of lower softening point themselves may be used as plasticizers of other normally brittle substances.

The low molecular weight polymers herein described also may be dissolved or dispersed in oils, such as linseed oil, China-wood oil, perilla oil, soya bean oil, etc., alone or mixed with solvents, pigments, plasticizers, driers and other components of coating compositions to yield products which, when applied to a base member and air-dried or baked, have a high degree of heat resistance.

Laminated products may be made by superimposing organic or inorganic fibrous sheet materials coated and impregnated with an aroxy silicone, and thereafter bonding the sheets together under heat and pressure. Molding compositions and molded articles also may be formed from these new silicones. If desired, filling materials such as asbestos, glass fibers, talc, quartz powder, wood flour, etc., may be incorporated into such compositions prior to molding. Shaped articles are formed from such compositions under heat or under heat and pressure in accordance with practices now widely used in the plastics arts.

What I claim as new and desire to secure by Letters Patent of the United States is:

1. A composition of matter comprising a chemical compound having the formula $R_2SiO$ where R is A—O—A', A is an aryl radical and A' is a member of the class consisting of alkyl and aryl radicals.

2. As a new product, an aroxy silicone of the class consisting of aroxyaryl and aroxyalkyl silicones containing an average of not more than two aroxy groups per silicon atom.

3. A composition comprising a polymer having the unit structure $R_2SiO$ where R is the radical of a diaryl ether.

4. A resinous mass comprising a polymer having the unit structure $R_2SiO$ where R is the radical of a halogenated diaryl ether.

5. A resinous mass comprising a polymer having the unit structure $R_2SiO$ where R is the radical of diphenyl ether.

6. A composition comprising a polymer having the unit structure $R_2SiO$ where R is the radical of chlorinated diphenyl ether.

7. Polymeric aroxyaryl silicone containing an average of less than two aroxyaryl groups per silicon atom.

8. Polymeric phenoxyphenyl silicone containing an average of less than two phenoxyphenyl groups per silicon atom.

9. Polymeric aroxyalkyl silicone containing an average of less than two aroxyalkyl groups per silicon atom.

10. Polymeric phenoxymethyl silicone containing an average of less than two phenoxymethyl groups per silicon atom.

11. A composition of matter comprising a mixture of polymers having the unit structure $R_2SiO$ where R is A—O—A', A is an aryl radical and A' is a member of the class consisting of alkyl and aryl radicals.

12. A product comprising polymeric aroxyaryl silicone containing an average of from about one to not more than two aroxyaryl groups per silicon atom.

13. A product comprising polymeric aroxyalkyl silicone containing an average of from about one to not more than two aroxyalkyl groups per silicon atom.

14. Polymeric phenoxyphenyl silicone containing an average of from about one to not more than two phenoxyphenyl groups per silicon atom.

15. A liquid coating composition comprising a volatile solvent and a soluble, partly polymerized aroxy silicone of the class consisting of aroxyaryl and aroxyalkyl silicones.

16. An article of manufacture comprising a base member having thereon a coating comprising an insoluble polymer of an aroxy silicone of the class consisting of aroxyaryl and aroxyalkyl silicones.

17. The method of preparing new chemical compounds which comprises hydrolyzing a mass containing a compound having the formula $(A—O—A')_2SiX_2$, where A is an aryl radical, A' is a member of the class consisting of alkyl and aryl radicals and X is a halogen atom, and dehydrating the hydrolyzed product.

18. An insulated electrical conductor comprising a metallic conductor and insulation thereon comprising at least one polymeric aroxy silicone of the class consisting of aroxyaryl and aroxyalkyl silicones.

19. An electrical cable comprising a metallic conductor and insulation thereon comprising an intimate association of fibrous inorganic material and a composition comprising a polymeric aroxyaryl silicone.

20. A composition comprising a mixture containing an organic plastic composition and at least one polymeric aroxy silicone of the class consisting of aroxyaryl and aroxyalkyl silicones.

EUGENE G. ROCHOW.